(12) United States Patent
Takimoto et al.

(10) Patent No.: US 10,260,431 B2
(45) Date of Patent: Apr. 16, 2019

(54) CONTROL DEVICE AND CONTROL METHOD FOR VARIABLE VALVE ACTUATION MECHANISM

(75) Inventors: Fumito Takimoto, Nagoya (JP); Tokiji Ito, Toyota (JP)

(73) Assignee: TOYOTA JIDOSHA KABUSHIKI KAISHA, Toyoshi-shi, Aichi-ken (JP)

(*) Notice: Subject to any disclaimer, the term of this patent is extended or adjusted under 35 U.S.C. 154(b) by 1417 days.

(21) Appl. No.: 13/004,395

(22) Filed: Jan. 11, 2011

(65) Prior Publication Data

US 2011/0174251 A1    Jul. 21, 2011

(30) Foreign Application Priority Data

Jan. 21, 2010  (JP) .................................. 2010-011108

(51) Int. Cl.
*F02D 13/02* (2006.01)
*F01L 9/04* (2006.01)

(52) U.S. Cl.
CPC ............ *F02D 13/0261* (2013.01); *F01L 9/04* (2013.01); *F01L 2800/16* (2013.01); *Y02T 10/18* (2013.01)

(58) Field of Classification Search
CPC ..... F02D 13/0261; F01L 2800/16; F01L 9/04; Y02T 10/18
USPC .............................. 123/90.15–90.17; 701/103
See application file for complete search history.

(56) References Cited

U.S. PATENT DOCUMENTS

| 5,456,224 | A  | * | 10/1995 | Riley | ......................... | 123/90.16 |
| 5,738,053 | A  |   | 4/1998  | Kato  |                           |           |
| 7,513,231 | B2 | * | 4/2009  | Ezaki et al. | ................ | 123/90.17 |
| 7,568,457 | B2 | * | 8/2009  | Kusaka et al. | .............. | 123/90.16 |
| 2003/0015155 | A1 | * | 1/2003 | Turner | ....................... | F01L 9/02 123/90.12 |
| 2004/0261736 | A1 | * | 12/2004 | Babbitt | ...................... | F01L 9/02 123/90.13 |
| 2005/0103291 | A1 | * | 5/2005 | Magner | .................... | F01L 1/022 123/90.16 |
| 2005/0211207 | A1 | * | 9/2005 | Urushihata | ............. | F01L 1/024 123/90.17 |
| 2006/0027196 | A1 | * | 2/2006 | Shimojo et al. | ........... | 123/90.17 |
| 2007/0283925 | A1 | * | 12/2007 | Nagashima et al. | ...... | 123/406.12 |
| 2008/0183370 | A1 | * | 7/2008 | Takamiya | ............. | F02D 31/003 701/103 |

FOREIGN PATENT DOCUMENTS

| DE | 10140635 A1 | * | 4/2003 |
| DE | 196 34 136 B4 |   | 1/2004 |

(Continued)

OTHER PUBLICATIONS

German Office Action dated Apr. 16, 2013 in German Patent Application No. 10 2010 061 636.2.

*Primary Examiner* — Mahmoud Gimie
*Assistant Examiner* — Joshua Campbell
(74) *Attorney, Agent, or Firm* — Sughrue Mion, PLLC

(57) ABSTRACT

A control device includes an engine valve and a variable valve actuation mechanism that is able to change at least one of a valve operating angle and valve lift of the engine valve. When the at least one of the valve operating angle and the valve lift is larger than or equal to a prescribed upper limit, the control device increases an operating speed of the variable valve actuation mechanism as compared with when the at least one of the valve operating angle and the valve lift is smaller than the prescribed upper limit.

5 Claims, 7 Drawing Sheets

(56) References Cited

FOREIGN PATENT DOCUMENTS

| | | |
|---|---|---|
| DE | 10 2007 000260 A1 | 11/2007 |
| JP | 2000-087769 A | 3/2000 |
| JP | 2002-332876 A | 11/2002 |
| JP | 2009-215889 A | 9/2009 |
| WO | WO 2009022729 A1 * | 2/2009 |

* cited by examiner

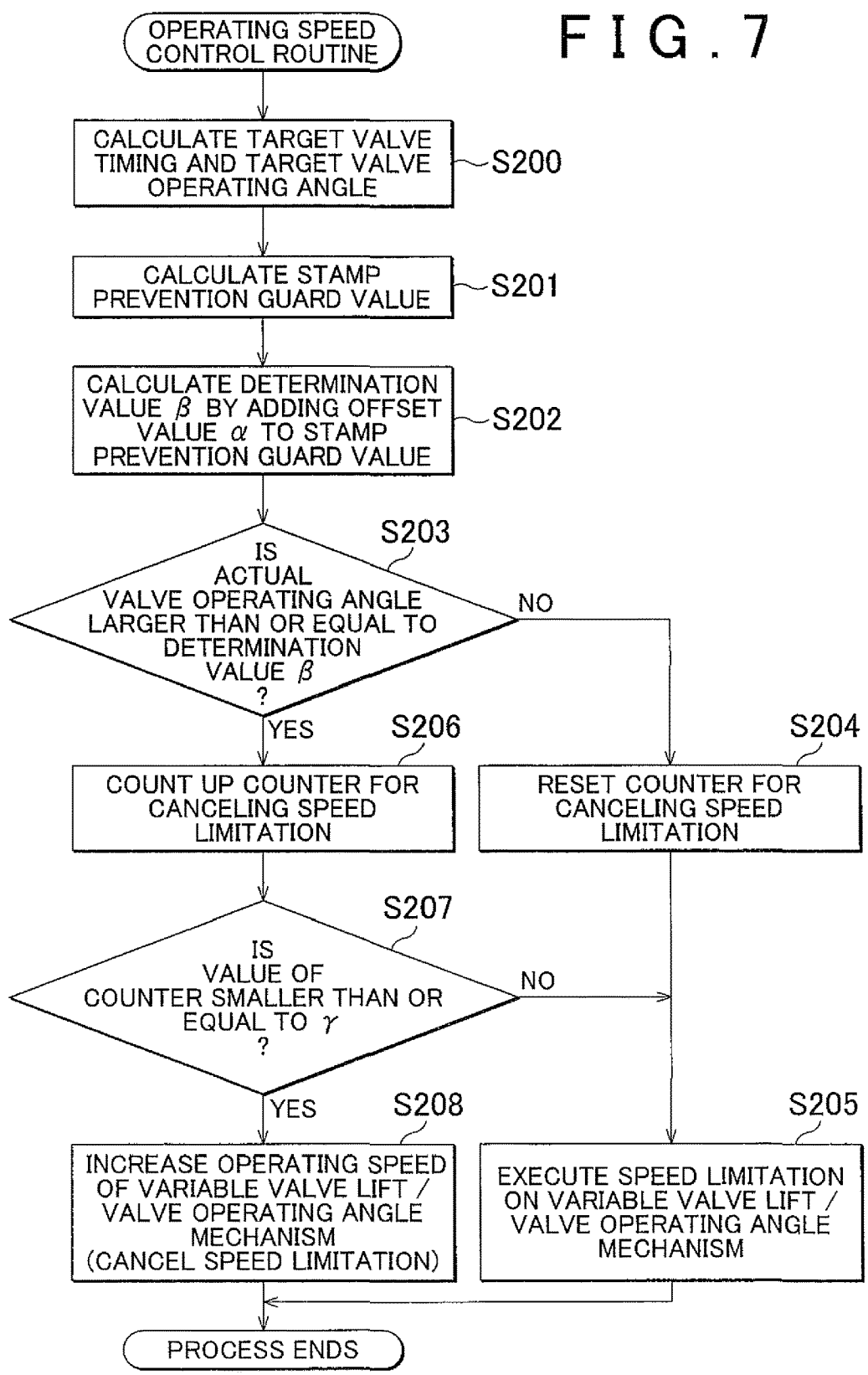

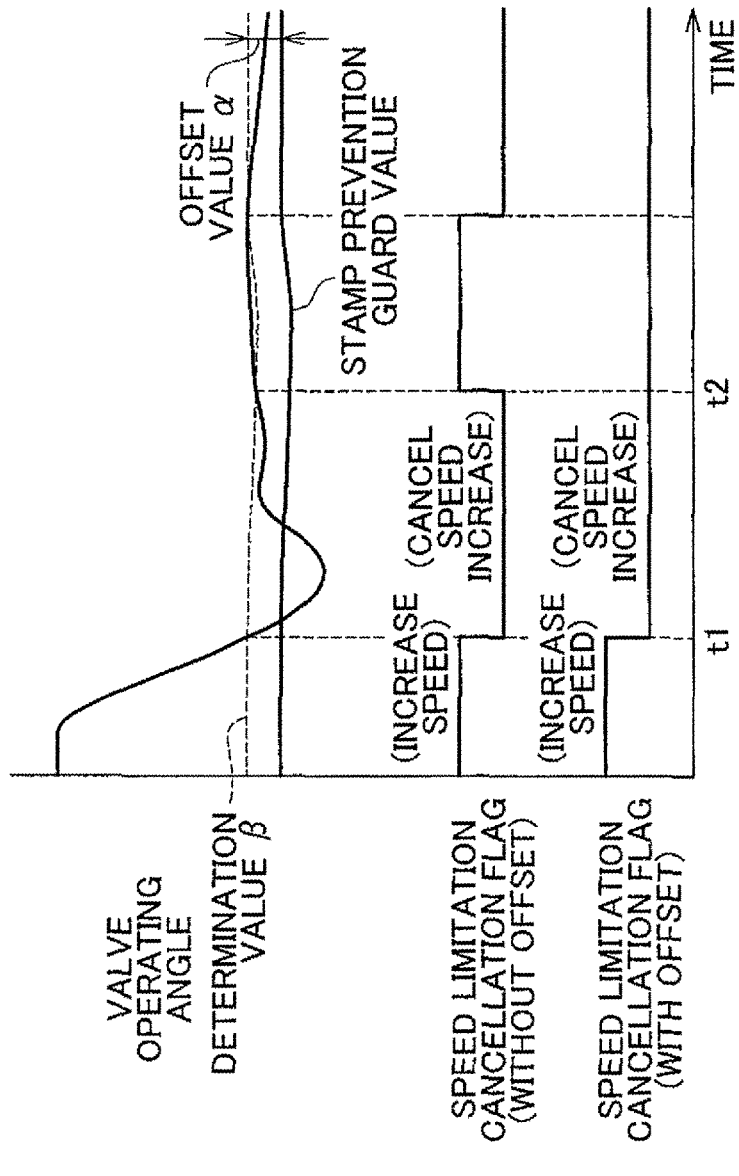

CONTROL DEVICE AND CONTROL METHOD FOR VARIABLE VALVE ACTUATION MECHANISM

INCORPORATION BY REFERENCE

The disclosure of Japanese Patent Application No. 2010-011108 filed on Jan. 21, 2010 including the specification, drawings and abstract is incorporated herein by reference in its entirety.

BACKGROUND OF THE INVENTION

1. Field of the Invention

The invention relates to a control device and control method for a variable valve actuation mechanism that is able to change at least one of the valve operating angle and valve lift of an engine valve.

2. Description of the Related Art

A variable valve actuation mechanism that is able to change the valve characteristics of an engine valve (intake or exhaust valve) is practically used as a mechanism equipped for, for example, a vehicle-mounted internal combustion engine. A variable valve timing mechanism that is able to change the valve timing of an engine valve, a variable valve lift/valve operating angle mechanism that is able to change the valve operating angle or valve lift of an engine valve, or the like, is known as such a variable valve actuation mechanism.

In an internal combustion engine that includes the variable valve lift/valve operating angle mechanism, when the valve operating angle or the valve lift is excessive, the engine valve may interfere with a piston, that is, so-called valve stamp may occur. Then, in such an internal combustion engine, the control range of the valve operating angle or valve lift is limited to a lower limit or below of an interference region in which valve stamp may possibly occur to thereby avoid valve stamp.

On the other hand, in an internal combustion engine that includes both variable valve actuation mechanisms, that is, the variable valve lift/valve operating angle mechanism and the variable valve timing mechanism, a lower limit of the interference region varies in accordance with the set valve timing. Specifically, as the valve timing is changed so that the valve lift center approaches a piston top dead center, the lower limit of the interference region, that is, the upper limit of the valve operating angle/valve lift, by which valve stamp may be avoided, reduces. Then, in such an internal combustion engine, the upper limit of the control range of the valve operating angle or valve lift is changed on the basis of a current valve timing (actual valve timing) to thereby variably control the valve operating angle or the valve lift while avoiding valve stamp.

Incidentally, depending on circumstances, there is a possibility that an actual valve operating angle or an actual valve lift overshoots a target value. In such a case, even when the target valve operating angle or the target valve lift is set to fall outside the interference region, the valve operating angle or the valve lift may fall within the interference region to cause valve stamp.

For example, in a control device for a variable valve actuation mechanism, described in Japanese Patent Application Publication No. 2002-332876 (JP-A-2002-332876), when an actual valve operating angle or an actual valve lift is larger by a predetermined value or above than the target value, a target valve timing is corrected so that the valve lift center is distanced from the piston top dead center to thereby increase the lower limit of the interference region.

With the above control device for a variable valve actuation mechanism, valve stamp due to an overshoot of the valve operating angle or valve lift as described above may be avoided certainly. However, because the target valve timing is corrected each time an actual valve operating angle or an actual valve lift increases by a predetermined value or above than a target value, there is a problem that it is difficult to set an appropriate valve timing in accordance with an engine operating condition.

SUMMARY OF INVENTION

The invention provides a control device and a control method for a variable valve actuation mechanism, which are able to further suitably avoid valve stamp.

A first aspect of the invention relates to a control device. The control device includes: an engine valve and a variable valve actuation mechanism that is able to change at least one of a valve operating angle and valve lift of the engine valve, wherein, when the at least one of the valve operating angle and the valve lift is larger than or equal to a prescribed upper limit, the control device increases an operating speed of the variable valve actuation mechanism as compared with when the at least one of the valve operating angle and the valve lift is not larger than or equal to the prescribed upper limit.

When the valve operating angle or valve lift of the engine valve is excessive and then the valve operating angle or the valve lift falls within an interference region in which valve stamp may occur, the variable valve actuation mechanism is driven so that the valve operating angle or the valve lift is smaller than or equal to a guard value that is set in order to avoid valve stamp. That is, when the valve operating angle or the valve lift exceeds the upper limit below which valve stamp may be reliably avoided, the variable valve actuation mechanism is driven in order to bring the valve operating angle or the valve lift outside the interference region. With the above configuration, at the time of bringing the valve operating angle or the valve lift outside the interference region, the operating speed of the variable valve actuation mechanism is increased, so it is possible to quickly bring the valve operating angle or the valve lift outside the interference region. Thus, with the above configuration, it is possible to further suitably avoid valve stamp.

A second aspect of the invention relates to a control method for a variable valve actuation mechanism that is able to change at least one of a valve operating angle and valve lift of an engine valve. The control method for a variable valve actuation mechanism includes: determining whether the at least one of the valve operating angle and the valve lift is larger than or equal to a prescribed upper limit; and, when the at least one of the valve operating angle and the valve lift is larger than or equal to the prescribed upper limit, increasing an operating speed of the variable valve actuation mechanism as compared with when the at least one of the valve operating angle and the valve lift is smaller than the prescribed upper limit.

BRIEF DESCRIPTION OF DRAWINGS

The features, advantages, and technical and industrial significance of this invention will be described below with reference to the accompanying drawings, in which like numerals denote like elements, and wherein:

FIG. 7 is a flowchart of an operating speed control routine employed in the second embodiment;

FIG. 8A to FIG. 8C are time charts that show the control mode of the control device for a variable valve actuation mechanism according to the third embodiment of the invention in comparison with the control mode of the second embodiment.

DETAILED DESCRIPTION OF EMBODIMENTS

Hereinafter, a control device for a variable valve actuation mechanism according to a first embodiment of the invention will be described in detail with reference to FIG. 1 to FIG. 5. Note that an internal combustion engine applied to the present embodiment is provided with two variable valve actuation mechanisms, that is, a variable valve timing mechanism that is able to change the valve timing of an intake valve and a variable valve lift/valve operating angle mechanism that is able to change the valve operating angle and valve lift of the intake valve.

Figure 1:
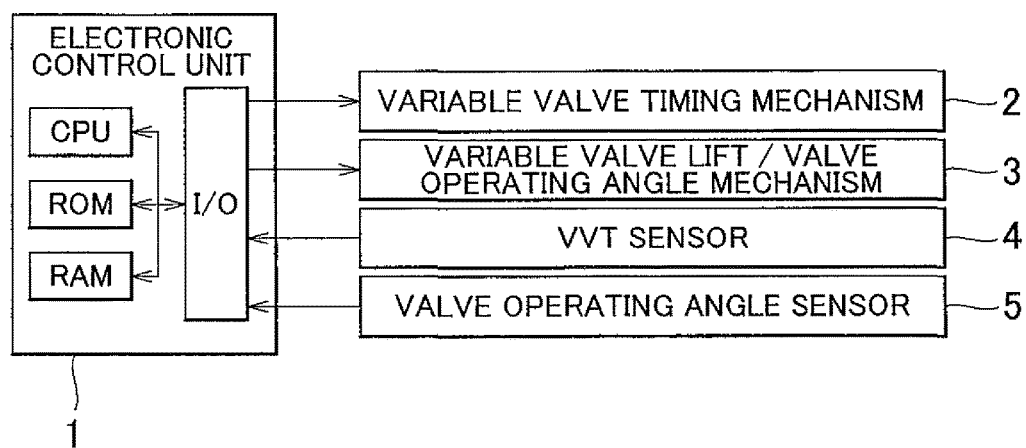
FIG. 1 is a block diagram that schematically shows the overall configuration of a control device for a variable valve actuation mechanism according to first to third embodiments of the invention.

FIG. 1 shows the overall configuration of first to third embodiments of the invention. As shown in the drawing, the control device for a variable valve actuation mechanism according to the present embodiment is mainly formed of an electronic control unit 1 that comprehensively governs engine control.

The electronic control unit 1 includes a central processing unit (CPU), a read only memory (ROM), a random access memory (RAM) and an input/output port (I/O). The CPU carries out various types of processing in connection with engine control, and the ROM stores programs and data for engine control. In addition, the RAM temporarily stores the processing results of the CPU, the results detected by sensors, and the like, and the I/O governs transmission and reception of signals with external devices.

Driving circuits of two types of variable valve actuation mechanisms, that is, the variable valve timing mechanism 2 and the variable valve lift/valve operating angle mechanism 3, are connected to the I/O of the electronic control unit 1. In addition, various sensors for detecting an engine operating condition are connected to the I/O of the electronic control unit 1. The various sensors include a VVT sensor 4 that detects the valve timing of the intake valve and a valve operating angle sensor 5 that detects the valve operating angle of the intake valve.

Figure 2:
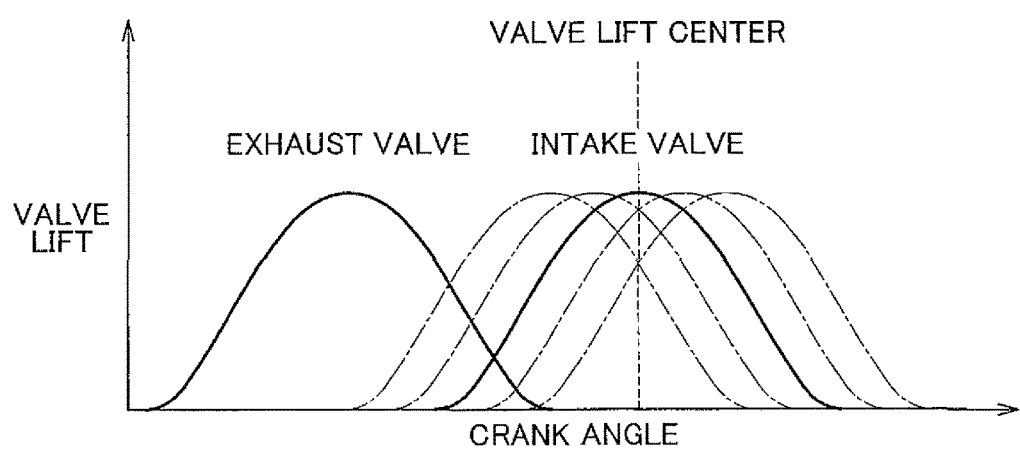
FIG. 2 is a graph that shows a mode in which a valve timing is changed in the first embodiment.

FIG. 2 shows a mode in which the valve timing of the intake valve is changed by the variable valve timing mechanism 2 in the present embodiment. As shown in the graph, in the internal combustion engine applied to the present embodiment, the valve lift center of the intake valve is continuously varied by the variable valve timing mechanism 2.

Figure 3:
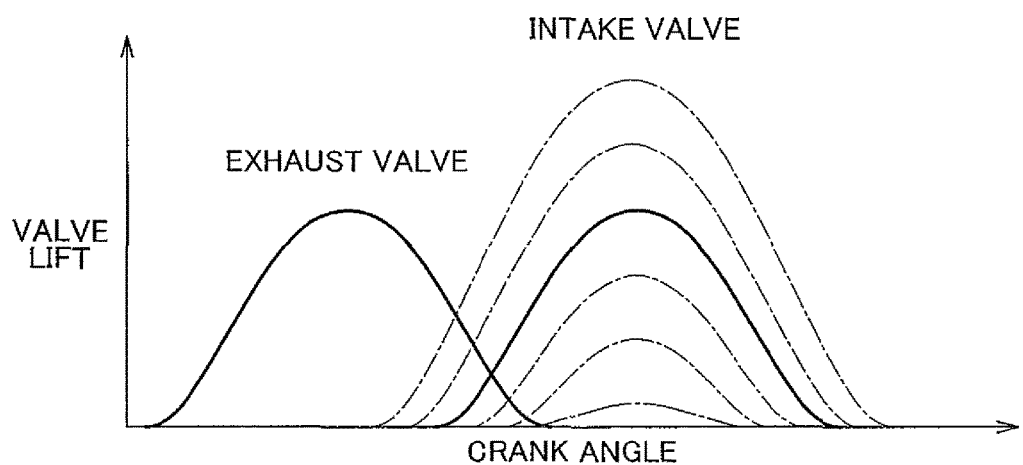
FIG. 3 is a graph that shows a mode in which a valve operating angle and a valve lift are changed in the first embodiment.

FIG. 3 shows a mode in which the valve lift/valve operating angle of the intake valve is changed by the variable valve lift/valve operating angle mechanism 3 in the present embodiment. As shown in the graph, in the internal combustion engine applied to the present embodiment, the valve operating angle or valve lift of the intake valve is continuously changed by the variable valve lift/valve operating angle mechanism 3.

Note that, in the present embodiment, in order to avoid deterioration in drivability due to a steep variation in the valve operating angle or valve lift of the intake valve or a decrease in durability of an actuator due to an excessive load, a predetermined limit is imposed on the operating speed of the variable valve lift/valve operating angle mechanism 3. Therefore, during normal engine operation, the variable valve lift/valve operating angle mechanism 3 is operated at a speed that is lower than an outputable maximum speed.

Figure 4:
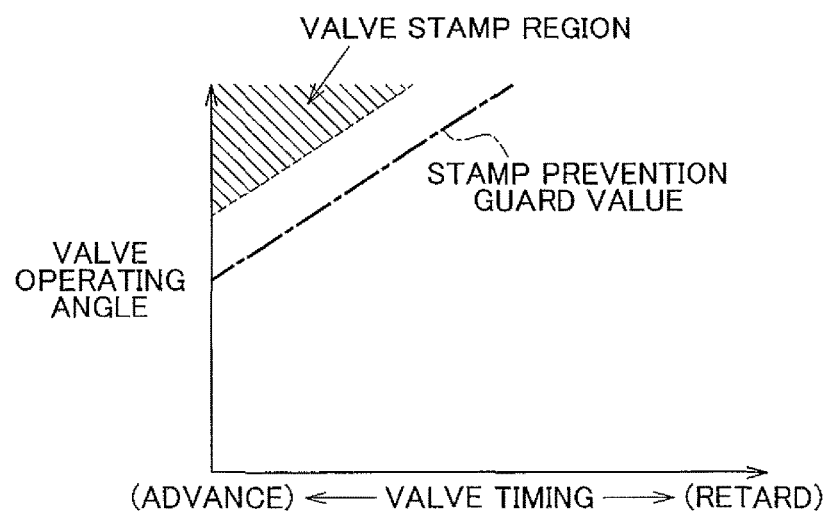
FIG. 4 is a graph that shows a mode in which a guard value is set in the first embodiment.

In the internal combustion engine that includes the above two variable valve actuation mechanisms, the valve operating angle/valve lift of the intake valve, at which valve stamp occurs, varies in accordance with the set valve timing of the intake valve. Then, as shown in FIG. 4, the electronic control unit 1 variably sets a stamp prevention guard value on the basis of an actual value of the valve timing (actual valve timing) of the intake valve. The stamp prevention guard value is an upper limit of a control range in which the valve operating angle of the intake valve is controlled by the variable valve lift/valve operating angle mechanism 3. Note that, more strictly, the stamp prevention guard value is set in consideration of an actual valve operating angle, a target valve timing, and the like, as well.

In the internal combustion engine that includes the above two variable valve actuation mechanisms, as the stamp prevention guard value steeply varies because of a steep variation in valve timing in response to an engine operating condition, the valve operating angle/valve lift of the intake valve may remain within an interference region in which valve stamp may possibly occur (valve stamp region). Then, in the present embodiment, when an actual value of the valve operating angle (actual valve operating angle) of the intake valve, detected by the valve operating angle sensor 5, is larger than or equal to the stamp prevention guard value, the above described limitation of the operating speed is cancelled to increase the operating speed of the variable valve lift/valve operating angle mechanism 3 to thereby quickly bring the valve operating angle of the intake valve outside the interference region.

Figure 5:
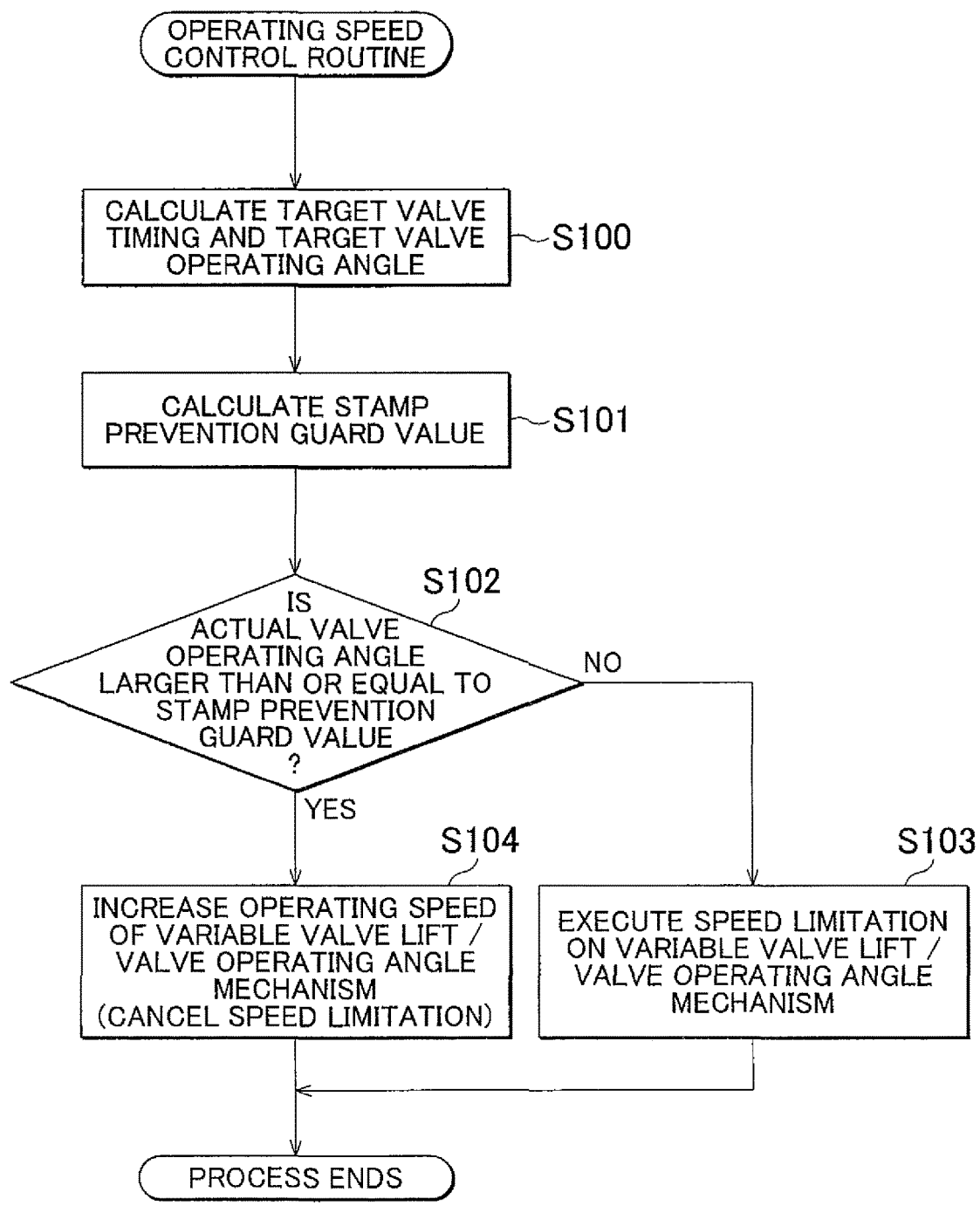
FIG. 5 is a flowchart of an operating speed control routine employed in the first embodiment.

FIG. 5 shows a flowchart of an operating speed control routine employed in the present embodiment. The process of the routine is repeatedly executed at predetermined control intervals by the electronic control unit 1 during engine operation.

When the routine is started, the electronic control unit 1 first calculates target values of the valve timing and valve operating angle of the intake valve, that is, a target valve timing and a target valve operating angle, on the basis of a current engine operating condition in step S100. Then, the electronic control unit 1 sends the calculated target valve timing and the calculated target valve operating angle to the variable valve timing mechanism 2 and the variable valve lift/valve operating angle mechanism 3.

Subsequently, in step S101, the electronic control unit 1 calculates a stamp prevention guard value from an actual valve operating angle, an actual valve timing, the target valve timing, and the like. Note that the target valve operating angle is limited so as to be smaller than or equal to the calculated stamp prevention guard value. In addition, the calculated stamp prevention guard value may be set to a value by which valve stamp may be reliably prevented in consideration of an estimated error of the valve operating angle due to the influence of an instantaneous interruption, or the like.

After that, in step S102, the electronic control unit 1 determines whether the actual valve operating angle is larger than or equal to the stamp prevention guard value. Here, when the actual valve operating angle is smaller than the stamp prevention guard value (S102: NO), the electronic control unit 1 proceeds to step S103 and then, in step S103, drives the variable valve lift/valve operating angle mechanism 3 while limiting the operating speed as normal.

On the other hand, when the actual valve operating angle is larger than or equal to the stamp prevention guard value (S102: YES), the electronic control unit 1 proceeds to step S104 and then, in step S104, cancels limitation of the operating speed and drives the variable valve lift/valve operating angle mechanism 3 in a state where the operating speed is increased as compared with that during normal times.

Note that, in the present embodiment, the stamp prevention guard value corresponds to the above "prescribed upper limit" and "guard value of a valve operating angle or valve lift that is set to avoid valve stamp".

With the above described control device for a variable valve actuation mechanism, the following advantageous effects may be obtained.

(1) In the present embodiment, when the actual valve operating angle is larger than or equal to a prescribed upper limit (stamp prevention guard value), limitation of the operating speed is cancelled to increase the operating speed of the variable valve lift/valve operating angle mechanism 3 as compared with when the actual valve operating angle is not larger than or equal to the prescribed upper limit. Therefore, in the present embodiment, it is possible to quickly bring the valve operating angle or the valve lift outside the interference region.

(2) In the present embodiment, because valve stamp is avoided only by controlling the variable valve lift/valve operating angle mechanism 3, it is possible to minimize the influence on the other control, such as valve timing control.

Figures 6A, 6B, 6C:
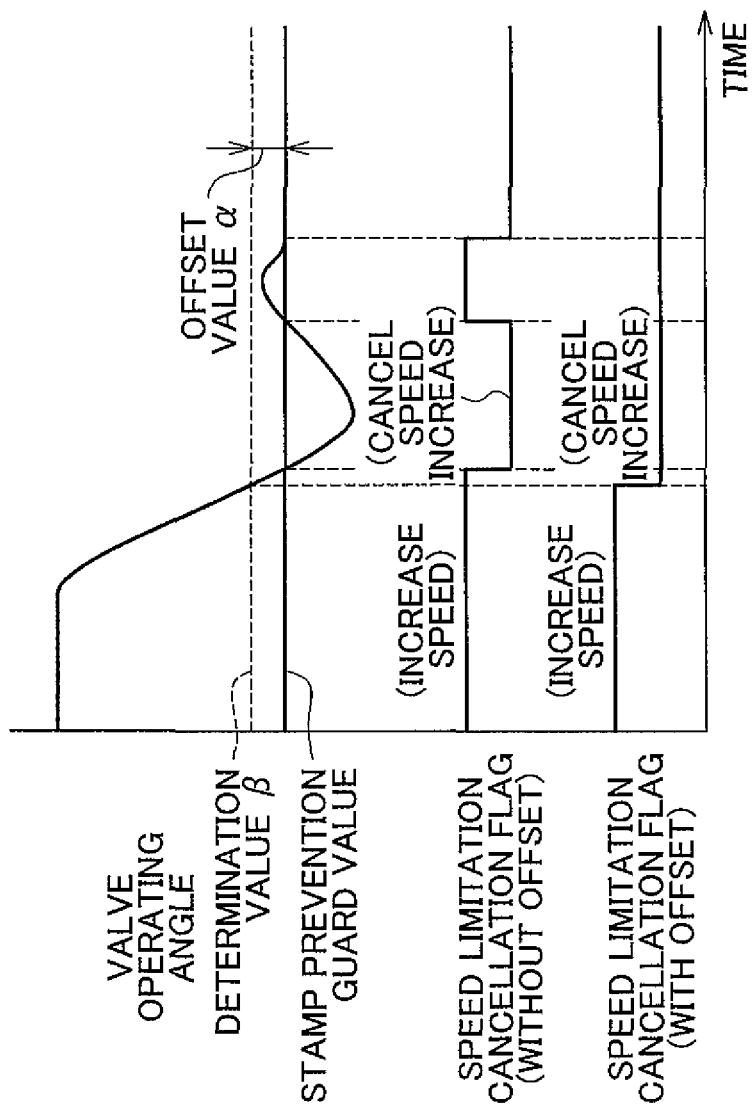
FIG. 6A to FIG. 6C are time charts that show the control mode of the control device for a variable valve actuation mechanism according to the second embodiment of the invention in comparison with the control mode of the first embodiment.

Next, a control device for a variable valve actuation mechanism according to the second embodiment of the invention will be described in detail with reference to FIG. 6A to FIG. 7. Note that, in the present embodiment, like reference numerals denote similar components to those of the first embodiment and the detailed description thereof is omitted.

As described above, in the first embodiment, when the actual valve operating angle is larger than or equal to the stamp prevention guard value, the operating speed of the variable valve lift/valve operating angle mechanism 3 is increased as compared with that during normal times. In this case, until the actual valve operating angle becomes smaller than the stamp prevention guard value, the variable valve lift/valve operating angle mechanism 3 is steeply operated. Note that, at this time, the operating speed of the variable valve lift/valve operating angle mechanism 3 is high, so, as shown in FIG. 6A, the actual valve operating angle may significantly undershoot the stamp prevention guard value.

In this case, the electronic control unit 1 increases the valve operating angle in order to recover from the undershoot; however, the valve operating angle may overshoot at this time and, therefore, may exceed the stamp prevention guard value again. As the overshoot occurs in this way, as shown in FIG. 6B, the increase of the operating speed has been once cancelled at the time when the actual valve operating angle falls below the stamp prevention guard value but the operating speed is increased again, and then increasing the operating speed is unnecessarily repeated to thereby cause hunting of speed increasing control.

Then, in the present embodiment, a determination value $\beta$ used for determining whether to increase the operating speed is set to a value larger by a prescribed offset value $\alpha$ than the stamp prevention guard value. In the thus configured present embodiment, as shown in FIG. 6C, even when the valve operating angle overshoots because of recovery from the undershoot, the operating speed is not increased again. Note that, in the thus configured present embodiment, the stamp prevention guard value corresponds to the above "guard value of the valve operating angle or valve lift that is set to avoid valve stamp", and the determination value $\beta$ set by adding the offset value $\alpha$ to the stamp prevention guard value corresponds to the above "prescribed upper limit".

On the other hand, when the convergence of the valve operating angle is deteriorated because of some hardware factors, it may require a long period of time to bring the valve operating angle outside the interference region. In such a case, the actuator of the variable valve lift/valve operating angle mechanism 3 is maintained in a high load state over a long period of time, so the durability may decrease. Then, in the present embodiment, when the duration during which the operating speed is increased exceeds a predetermined value, the increase of the operating speed is cancelled to thereby avoid an excessive load on the actuator.

In addition, the operation of the variable valve lift/valve operating angle mechanism 3 for bringing the valve operating angle or the valve lift outside the interference region is carried out so as to reduce the valve operating angle or the valve lift. Thus, when only the operating speed of the variable valve lift/valve operating angle mechanism 3 for reducing the valve operating angle or the valve lift is increased, valve stamp may be avoided even when the operating speed of the variable valve lift/valve operating angle mechanism 3 for increasing the valve operating angle or the valve lift is not increased. Then, in the present embodiment, in addition, only the operating speed of the variable valve lift/valve operating angle mechanism 3 for reducing the valve operating angle or the valve lift is increased.

FIG. 7 is a flowchart of an operating speed control routine employed in the present embodiment. The process of the routine is repeatedly executed at predetermined control intervals by the electronic control unit 1 during engine operation.

When the routine is started, the electronic control unit 1 first calculates the target valve timing and target valve operating angle of the intake valve on the basis of a current engine operating condition in step S200. Subsequently, the electronic control unit 1 calculates a stamp prevention guard value from an actual valve operating angle, an actual valve timing, the target valve timing, and the like, in step S201.

Subsequently, in step S202, the electronic control unit 1 calculates a determination value $\beta$ that is obtained by adding a prescribed offset value $\alpha$ to the stamp prevention guard value. Note that the offset value $\alpha$ is set to a value that is slightly larger than an assumed value of an overshoot of the valve operating angle due to recovery from an undershoot.

After that, in step S203, the electronic control unit 1 determines whether the actual valve operating angle is larger than or equal to the determination value β. Here, when the actual valve operating angle is smaller than the determination value β (S203: NO), the electronic control unit 1 resets a counter for canceling speed limitation, which will be described later, in step S204, limits the operating speed as normal in subsequent step S205 and then drives the variable valve lift/valve operating angle mechanism 3.

On the other hand, when the actual valve operating angle is larger than or equal to the determination value β (S203: YES), the electronic control unit 1 proceeds to step S206, and counts up the value of the counter for canceling speed limitation in step S206. In addition, the electronic control unit 1 determines in subsequent step S207 whether the value of the counter is smaller than or equal to a predetermined value γ. Then, when the value of the counter is smaller than or equal to the predetermined value γ (S207: YES), the electronic control unit 1 proceeds to step S208, and then, in step S208, cancels limitation of the operating speed and drives the variable valve lift/valve operating angle mechanism 3 in a state where the operating speed is increased as compared with that during normal times.

The value of the counter for canceling speed limitation indicates the number of times the routine is executed after the operating speed of the variable valve lift/valve operating angle mechanism 3 is increased. That is, the value of the counter is an index value of a duration during which the operating speed is increased. Then, when the value of the counter exceeds the predetermined value γ (S207: NO), the electronic control unit 1 proceeds to step S205 and then, in step S205, drives the variable valve lift/valve operating angle mechanism 3 in a state where the operating speed is limited as normal. That is, in the present embodiment, when the duration during which the operating speed is increased exceeds the predetermined value, the increase of the operating speed is cancelled (that is, the operating speed is not increased).

According to the above described present embodiment, in addition to the advantageous effects described in the above (1) and (2), the following advantageous effects may be further obtained.

(3) In the present embodiment, the determination value β for determining whether to increase the operating speed is set to a value that is larger by the prescribed offset value α than the stamp prevention guard value. Therefore, even when the valve operating angle overshoots because of recovery from an undershoot, it is possible not to increase the operating speed again.

(4) In the present embodiment, when the duration during which the operating speed is increased exceeds the predetermined value, the increase of the operating speed is cancelled. Therefore, it is possible to avoid a situation that the operating speed of the variable valve lift/valve operating angle mechanism 3 is increased over a long period of time and then the actuator receives an excessive load.

(5) In the present embodiment, only the operating speed of the variable valve lift/valve operating angle mechanism 3 for reducing the valve operating angle or the valve lift is increased. Therefore, for the operation of the variable valve lift/valve operating angle mechanism 3 for increasing the valve operating angle/valve lift, which is unnecessary for bringing the valve operating angle or the valve lift outside the interference region, the operating speed is not increased. Thus, it is possible to prevent an unnecessary increase in load on the actuator of the variable valve lift/valve operating angle mechanism 3 or deterioration in the convergence of the valve operating angle due to an unnecessary increase of the operating speed.

Next, a control device for a variable valve actuation mechanism according to the third embodiment of the invention will be described in detail with reference to FIG. 8A to FIG. 9. Note that, in the present embodiment, like reference numerals denote similar components to those of the first and second embodiments and the detailed description thereof is omitted.

When the convergence or controllability of the valve operating angle is poor while the target valve operating angle is set to near the determination value β, there is a possibility that the actual valve operating angle fluctuates across the determination value β and then increasing the speed of the variable valve actuation mechanism and canceling the increase of the speed are unnecessarily repeated. In addition, in an internal combustion engine that also includes the variable valve timing mechanism 2 that is able to change the valve timing of the intake valve, a lower limit of the interference region varies with a variation in actual valve timing. Therefore, if the convergence or controllability of the valve timing is poor, there is a possibility that the determination value β for determining whether to increase the operating speed fluctuates and then increasing the speed of the variable valve lift/valve operating angle mechanism 3 and canceling the increase of the speed are unnecessarily repeated.

For example, in the example shown in FIG. 8A, the actual valve operating angle falls below the determination value β at time t1, and the increase of the operating speed of the variable valve lift/valve operating angle mechanism 3 is cancelled (speed limitation cancellation flag is off). The actual valve operating angle thereafter and the determination value β set in accordance with the actual valve timing, or the like, just slightly vary. Despite that, the actual valve operating angle exceeds the determination value β at time t2, so, in the control device according to the second embodiment, as shown in FIG. 8B, the operating speed of the variable valve lift/valve operating angle mechanism 3 is increased again.

When the valve operating angle or the valve lift falls within the interference region because of such a slight change in actual valve operating angle or determination value β, it is possible to quickly bring the valve operating angle or the valve lift outside the interference region without taking the trouble to increase the operating speed of the variable valve lift/valve operating angle mechanism 3. Then, in the present embodiment, only when both conditions of (A) the rate of change in the valve operating angle of the intake valve is higher than or equal to a predetermined value and (B) the rate of change in the valve timing of the intake valve is higher than or equal to a predetermined value are satisfied in addition to the condition that the actual valve operating angle is larger than or equal to the determination value β, the speed of the variable valve lift/valve operating angle mechanism 3 is increased in order to avoid valve stamp. In such a case, when the actual valve operating angle is larger than or equal to the determination value β and when there is a steep change in valve timing and valve operating angle, the operating speed of the variable valve lift/valve operating angle mechanism 3 is increased. Therefore, it is possible to avoid increasing the operating speed of the variable valve lift/valve operating angle mechanism 3 in accordance with a slight change in valve timing or valve operating angle due to poor convergence or controllability.

Thus, in the present embodiment, as shown in FIG. 8C, even when the actual valve operating angle exceeds the determination value β at time t2, the operating speed of the variable valve lift/valve operating angle mechanism 3 is not increased again.

Figure 9:
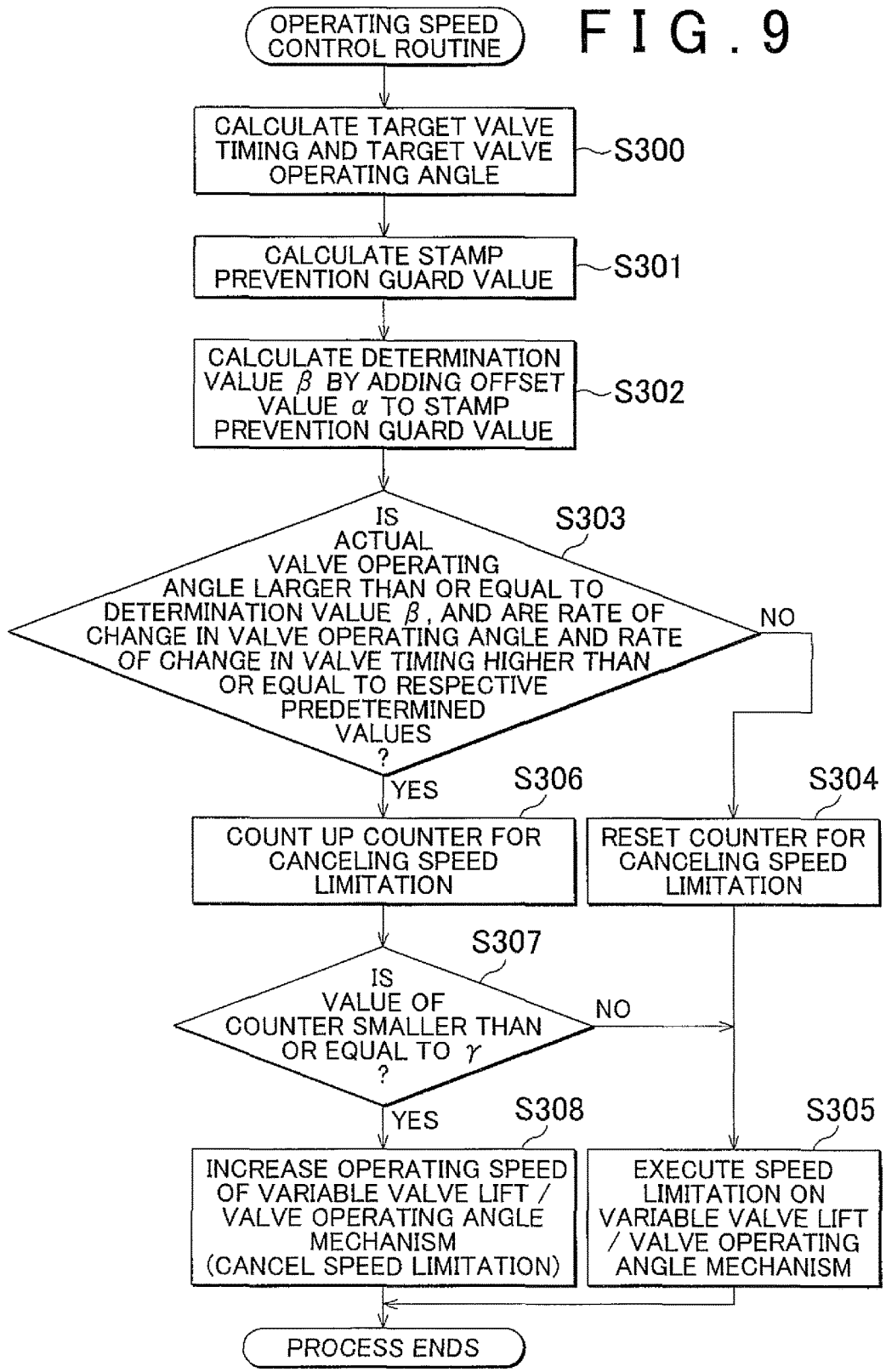
FIG. 9 is a flowchart of an operating speed control routine employed in the third embodiment.

FIG. 9 shows a flowchart of an operating speed control routine employed in the present embodiment. The process of the routine is repeatedly executed at predetermined control intervals by the electronic control unit 1 during engine operation.

When the routine is started, the electronic control unit 1 first calculates the target valve timing and target valve operating angle of the intake valve on the basis of a current engine operating condition in step S300. Subsequently, the electronic control unit 1 calculates a stamp prevention guard value from an actual valve operating angle, an actual valve timing, the target valve timing, and the like, in step S301. In addition, in step S302, the electronic control unit 1 calculates a determination value β as a value that is obtained by adding a prescribed offset value α to the stamp prevention guard value.

After that, in step S303, the electronic control unit 1 determines whether the actual valve operating angle is larger than or equal to the determination value β and a variation in actual valve operating angle and actual valve timing per unit time, that is, their rates of change, are higher than or equal to respective predetermined values. When negative determination (NO) is made in step S303, the electronic control unit 1 resets the value of a counter for canceling speed limitation in step S304 and then, in step S305, drives the variable valve lift/valve operating angle mechanism 3 in a state where the operating speed is limited as normal.

On the other hand, when affirmative determination (YES) is made in step S303, the electronic control unit 1 proceeds to step S306 and then counts up the value of the counter for canceling speed limitation in step S306. In addition, the electronic control unit 1 determines in subsequent step S307 whether the value of the counter is smaller than or equal to a predetermined value γ. Then, when the value of the counter is smaller than or equal to the predetermined value γ (S307: YES), the electronic control unit 1 proceeds to step S308, and then, in step S308, cancels limitation of the operating speed and drives the variable valve lift/valve operating angle mechanism 3 in a state where the operating speed is increased as compared with that during normal times. Then, when the value of the counter exceeds the predetermined value γ (S307: NO), the electronic control unit 1 proceeds to step S305 and then, in step S305, drives the variable valve lift/valve operating angle mechanism 3 in a state where the operating speed is limited as normal.

According to the above described present embodiment, in addition to the advantageous effects described in the above (1) to (5), the following advantageous effects may be further obtained.

(6) In the present embodiment, on condition that the rate of change in the actual valve operating angle is higher than or equal to the predetermined value, the operating speed of the variable valve lift/valve operating angle mechanism 3 is increased in order to avoid valve stamp. Therefore, it is possible to avoid a situation that the operating speed is unnecessarily increased in accordance with a slight change in actual valve operating angle.

(7) In the present embodiment, on condition that the rate of change in the actual valve timing is higher than or equal to the predetermined value, the operating speed of the variable valve lift/valve operating angle mechanism 3 is increased in order to avoid valve stamp. Therefore, it is possible to avoid a situation that the operating speed is unnecessarily increased in accordance with a slight change in actual valve timing.

Note that the above embodiments may be modified into the following alternative embodiments.

In the third embodiment, only when both conditions of (A) the rate of change in the valve operating angle of the intake valve is higher than or equal to a predetermined value and (B) the rate of change in the valve timing of the intake valve is higher than or equal to a predetermined value are satisfied in addition to the condition that the actual valve operating angle is larger than or equal to the determination value β, the speed of the variable valve lift/valve operating angle mechanism 3 is increased in order to avoid valve stamp. However, as a condition for increasing the speed of the variable valve lift/valve operating angle mechanism 3, only the condition (A) may be employed in addition to the condition that the actual valve operating angle is larger than or equal to the determination value β or only the condition (B) may be employed in addition to the condition that the actual valve operating angle is larger than or equal to the determination value β. In such a case as well, it is possible to avoid unnecessarily increasing the operating speed because of a slight change in any one of the valve operating angle and the valve timing.

In the second and third embodiments, the operating speed of the variable valve lift/valve operating angle mechanism 3 is increased only when the valve operating angle or the valve lift is reduced; however, where necessary, the operating speed may be increased when the valve operating angle or the valve lift is increased.

In the second and third embodiments, when the duration during which the operating speed is increased exceeds the predetermined value, the increase of the operating speed of the variable valve lift/valve operating angle mechanism 3 is cancelled. However, when a period of time from when the operating speed is increased to when the valve operating angle or the valve lift is brought outside the interference region does not extend to such an extent that the actuator receives an excessive load, the above process may be omitted.

In the second and third embodiments, the value that is obtained by adding the prescribed offset value α to the stamp prevention guard value is used as the determination value β used for determining whether to increase the operating speed of the variable valve lift/valve operating angle mechanism 3. However, when the convergence of the valve operating angle is sufficiently high and an overshoot of the valve operating angle due to recovery from an undershoot is sufficiently small, the above process may be omitted.

In the above embodiments, speed limitation is cancelled to increase the operating speed of the variable valve lift/valve operating angle mechanism 3 in order to avoid valve stamp; however, the operating speed may be increased in another mode, such as increasing a control gain or a driving duty.

In the above embodiments, the operation of the variable valve lift/valve operating angle mechanism 3 is controlled using the valve operating angle as a controlled variable; instead, the operation may be controlled using the valve lift as a controlled variable. In such a case, values, such as the stamp prevention guard value or the determination value β, are set for the valve lift.

In the above embodiments, the aspect of the invention is embodied as the control device for a variable valve actuation mechanism that is able to change the valve operating angle and valve lift of the intake valve; however, the aspect of the invention may be similarly embodied as a control device for a variable valve actuation mechanism that is able to change the valve operating angle and valve lift of an exhaust valve.

In the above embodiments, the aspect of the invention is applied to a variable valve actuation mechanism provided for an internal combustion engine that is subjected to not only control for changing the valve operating angle or the valve lift but also control for changing the valve timing; however, the aspect of the invention may be applied to a variable valve actuation mechanism provided for an internal combustion engine that is subjected to only control for changing the valve operating angle and the valve lift without control for changing the valve timing. In such a case, the stamp prevention guard value, the determination value β, and the like, may be set as fixed values.

The variable valve lift/valve operating angle mechanism 3 according to the above embodiments is configured as a variable valve actuation mechanism that is able to change both the valve operating angle and the valve lift; however, the aspect of the invention may be applied to a variable valve actuation mechanism that is able to change only the valve operating angle or only the valve lift.

What is claimed is:

1. A control device comprising:
an engine valve;
a valve timing sensor configured to detect an actual valve timing of the engine valve; and
an electronic control unit configured to continuously change a maximum valve operating angle and a maximum valve lift of the engine valve,
the electronic control unit configured to continuously change a valve timing of the engine valve, wherein
based upon at least one of the maximum valve operating angle or the maximum valve lift being larger than or equal to a prescribed upper limit, the electronic control unit cancels a speed limitation of an operating speed of the maximum operating angle and the maximum valve lift, and increases the operating speed of the maximum valve operating angle and the maximum valve lift of the engine valve as compared with when the at least one of the maximum valve operating angle or the maximum valve lift is smaller than the prescribed upper limit, wherein the prescribed upper limit is a stamp prevention guard value, and
the electronic control unit is configured to calculate the prescribed upper limit based on the actual valve timing detected by the valve timing sensor.

2. The control device according to claim 1, wherein, when a duration during which the operating speed is increased exceeds a prescribed value, the electronic control unit cancels the increase of the operating speed.

3. The control device according to claim 1, wherein, the operating speed is increased only when at least one of the maximum valve operating angle or the maximum valve lift is reduced.

4. The control device according to claim 1, wherein the operating speed is increased on condition that the at least one of the maximum valve operating angle or the maximum valve lift is larger than or equal to the prescribed upper limit and a rate of change in the at least one of the maximum valve operating angle or the maximum valve lift is higher than or equal to a predetermined value.

5. The control device according to claim 1, wherein the operating speed is increased on condition that the at least one of the maximum valve operating angle or the maximum valve lift is larger than or equal to the prescribed upper limit and a rate of change in the valve timing of the engine valve is higher than or equal to a predetermined value.

* * * * *